April 16, 1940.  J. W. MILLINGTON ET AL  2,197,571

BORE HOLE EXPLORING APPARATUS

Filed Oct. 3, 1938  2 Sheets-Sheet 1

WITNESS:
Rob R Mitchel.

John W. Millington
William T. Evans
BY
Busser & Harding
ATTORNEYS.

April 16, 1940.     J. W. MILLINGTON ET AL     2,197,571
BORE HOLE EXPLORING APPARATUS
Filed Oct. 3, 1938      2 Sheets—Sheet 2
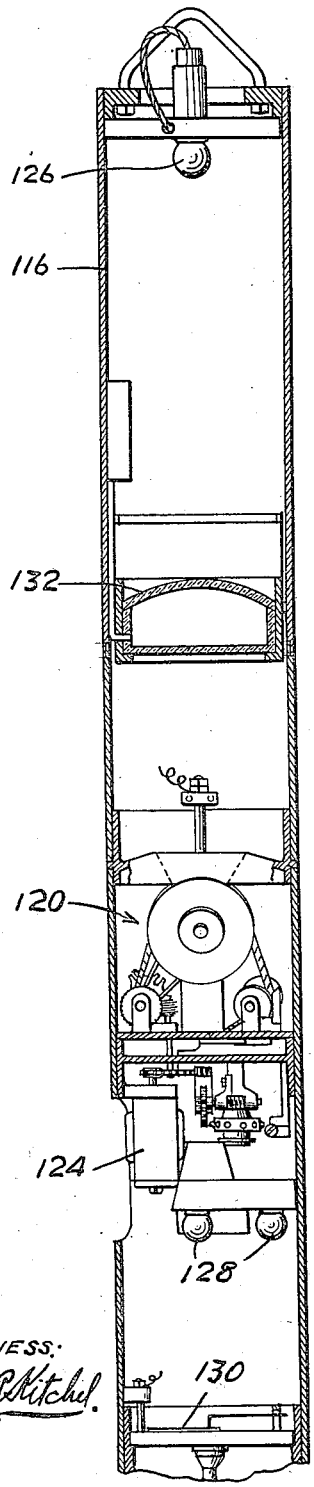
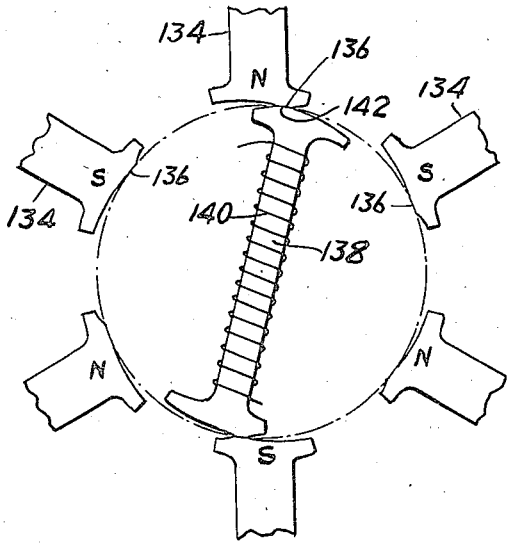
FIG.5.
FIG.4.
INVENTORS
John W. Millington
William T. Evans
BY
ATTORNEYS.
WITNESS:

Patented Apr. 16, 1940

2,197,571

UNITED STATES PATENT OFFICE 2,197,571

BORE HOLE EXPLORING APPARATUS

John W. Millington and William T. Evans, Beaumont, Tex., assignors, by mesne assignments, to Sperry-Sun Well Surveying Company, Philadelphia, Pa., a corporation of Delaware Application October 3, 1938, Serial No. 232,969

5 Claims. (Cl. 234—1.5)

This invention relates to bore hole exploring apparatus, which term is used generically in this case to indicate generally apparatus for making measurements within bore holes such as, for example, electrical logging apparatus or well surveying apparatus. The invention is concerned with the proper control in accordance with depth of apparatus located within a casing which is adapted to be moved through a bore hole and which is closed to withstand the pressures encountered in the hole.

In the case of well surveying apparatus or electrical logging apparatus or the like, it is generally desirable to make records within the bore hole of the indications of various pieces of apparatus which are passing through the hole. The records thus made should be correlated with the depth at which they are made, and to effect this result various arrangements have been used and numerous proposals have been made, the latter including proposals requiring motion to be transmitted mechanically through the casing, a proposal impracticable of achievement because of the enormous pressures encountered in a hole. One of the commonest methods of correlating the records with depth comprises recording the time when the records are made and simultaneously noting the depths reached at various times. From this data the depths at which the records are made may be determined. It has also been proposed to transmit signals to the recording apparatus when various depths are reached so as to correlate the records with depth. Electrical connections through a casing capable of withstanding bore hole pressures may be readily made.

In accordance with the present invention, the recording apparatus within the bore hole is operated in proportion to the depths which are reached by it, by utilization of an electrical connection between a device responsive to the length of cable played out at the surface and apparatus within the casing which is being lowered so that the latter is controlled by the former. Specifically, in accordance with the present invention, the records are made upon a continuous strip, preferably in the form of a photographic film, the feed of which strip is controlled by the feed of the cable at the surface.

The broad object of the invention is the attainment of the general results indicated above. This object and subsidiary objects, relating particularly to details of construction and operation, will be apparent from the following description, read in conjunction with the accompanying drawings, in which:

Figure 2 is a wiring diagram illustrating certain apparatus within the casing for the purpose of proper control of exposures or the like;

Figure 4 is a vertical sectional view showing a type of well surveying apparatus to which the invention is applied; and Figure 5 is a diagrammatic view illustrating an alternative form of motor adapted to be operated in synchronism with apparatus at the surface.

Fundamentally, the improved synchronizing arrangement comprises a motor within a casing along with other apparatus adapted for recording purposes, which motor is connected to the surface so as to be operated in synchronism with means which measures the depth of the apparatus within the bore hole. The invention is concerned in one of its more specific aspects with the attainment of proper synchronism consistent with varying speeds of lowering the cable and, furthermore, with the use of a cable carrying a minimum number of conductors. In accordance with the invention, a cable carrying a single conductor may be used, the return connection being made through the ground, though, as illustrated, a two-conductor cable is somewhat preferable. Cables containing one or two conductors and properly armored for use within bore holes are relatively inexpensive, but the expense increases rapidly with the number of conductors, and hence it is desirable to keep the number of conductors necessary at a minimum. For this purpose, there has been devised in accordance with the present invention, an apparatus operating through the use of direct current which will maintain synchronism despite varying speeds or interruption of the lowering of the cable.

Figure 1:
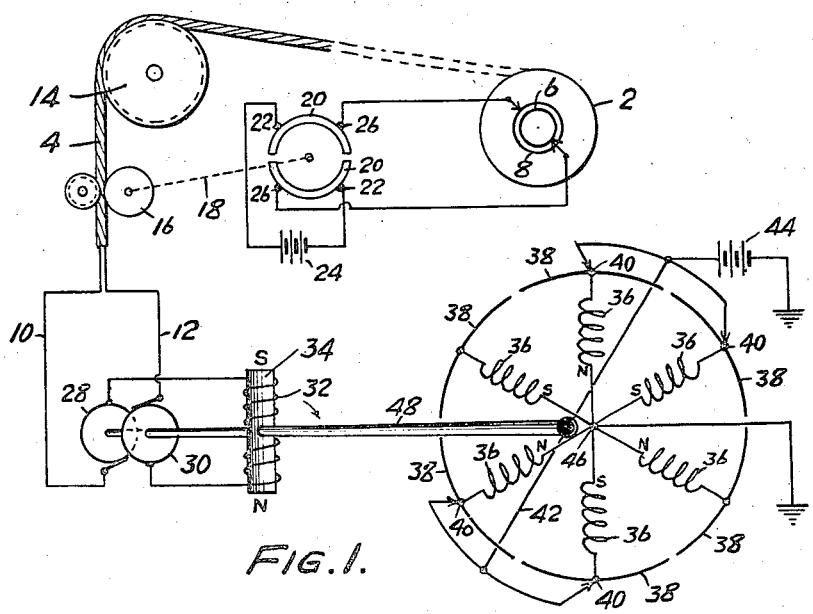
Figure 1 is a wiring diagram illustrating the synchronizing means between the surface apparatus and that within the casing.

Referring first to Figure 1, there is indicated at 2 the reel on which the cable 4, supporting the apparatus within the bore hole, is wound. This reel 2 is provided with slip rings 6 and 8 connected to the ends of the conductors 10 and 12, which are located within the cable. The cable, as usual, passes over a supporting pulley 14, and below this pulley the cable is engaged by means of a cable measuring device, conventionally illustrated at 16, which device may be of the usual form. Such devices, in order to give accurate indications of the depth of the apparatus which the cable supports, must engage the cable on its vertical run where it will be fully stretched so that the measuring takes account of the stretch of the cable and gives accurate indications.

The measuring apparatus 16 is connected, by means of elements 18, which may include step-up gearing, to a commutator comprising segments 20 with which engage brushes 22 connected to the poles of a battery 24 and with which also engage brushes 26 connected to brushes engaging the slip rings 6 and 8. With these connections as illustrated, the conductors 10 and 12 have imparted to them a voltage which alternates at a rate depending upon the rate of revolution of the commutator 20. The number of alternations bears a direct relationship to the depth of the apparatus supported by the cable 4.

The apparatus supported by the cable 4 may be, for example, a well surveying instrument, electrical logging apparatus, temperature measuring apparatus, or the like. Within the casing of this apparatus, examples of which will be later described, there is located a motor which is preferably of the type illustrated in the lower portion of Figure 1. This motor comprises a shaft 46 carrying slip rings 28 and 30 which are respectively engaged by brushes connected to the conductors 10 and 12. The slip rings are connected to the ends of an armature winding 32 carried by a two-pole armature indicated at 34 secured to the motor shaft.

The stator of the motor is provided with poles the windings of which are indicated at 36 and which are so arranged as to be alternately north and south. The pole windings, which are joined and grounded at one end of each as at 46, are connected at their other ends to stationary conducting segments 38 with which there engage brushes 40 mounted on the motor shaft 46 through the medium of arm 42 and connected to one pole of a battery 44 the other pole of which is grounded. By the arrangement of the brushes 40 as illustrated in Figure 1 it will be obvious that only four of the poles are energized simultaneously. As a consequence of this, assuming, for example, that the armature is at rest and at that time polarized as indicated in Figure 1 so as to occupy a vertical position in alignment with the vertically related pair of poles, upon change of the direction of current through its winding 32, so that its upper pole becomes north, it will rotate clockwise because only the poles in the clockwise direction are energized at the time. As it rotates, it carries the brushes 40 with it to effect energization of the next poles in the direction of advance of its rotation. As a consequence of this arrangement, the rotation of the armature is always in the same direction. Due regard must, of course, be had to the manipulation of the cable the motion of which should not be reversed unless account of that fact is taken.

The above arrangement for insuring that rotation occurs in only one direction makes it possible to use either a single conductor cable with ground return or a two-conductor cable. By use of a triple pole armature and three connections to the surface, (following the disclosure of the patent to Ford 1,153,210), it is possible to insure rotation in a predetermined direction without the use of brushes such as 40 or any other arrangement of unusual character, as indicated below. However, it is preferred to use an arrangement of the type indicated to avoid multiplicity of conductors within the cable.

Figure 2:
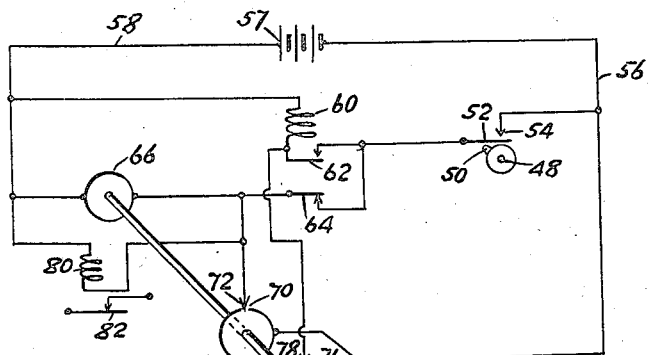

In the event that recording is accomplished by means of a stylus or the like, the motor, which has been just described, may be directly geared to a record strip with the result that the motion of the strip will be directly proportional to the depth of the apparatus. In making photographic records, however, the production of over exposure must be taken into account so that obviously some means must be provided to insure that, while the motion of the film is proportional to the depth, over exposure or improper exposures will not result if the lowering is slowed down or interrupted for substantial periods of time. To adapt the synchronizing apparatus to photographic recording, there may be utilized the auxiliary control apparatus indicated in Figure 2. In Figure 2 there is indicated at 48 the shaft of the motor previously described, or, alternatively, this may be taken to indicate a shaft geared thereto, but at any rate operating in synchronism with the motor shaft. This shaft carries a cam member 50 adapted to engage a follower 52 making contact with a point 54 connected to a line 56 extending from a battery 57, to the other pole of which there is connected a line 58. A relay 60 is provided with a pair of armatures 62 and 64. When the relay is deenergized, the contact of 62 is open and that at 64 is closed. The reverse condition occurs when the relay 60 is energized.

Connected between the armature 64 and the line 58 is a motor 66 which, preferably through reduction gearing, is arranged to drive conductor rings 68 and 74, the former of which is provided with a break indicated at 70 and the latter of which is provided with a break indicated at 76. These breaks are so arranged as to be opposite the respective brushes 72 and 78 at the same time. The brush 72, which is adapted to make contact with the ring 68, is connected between the motor 66 and the armature 64, while the brush 78, adapted to make contact with the ring 74, is connected to the side of the relay coil 60 which is connected to the armature 62, the other side of the relay coil being connected to the line 58. Shunted across the motor 66 so as to be energized whenever the motor is energized may be a second relay 80, adapted to close a contact indicated at 82 when the timing apparatus is adapted to be used for indirect control of another circuit. Such operation will be described hereafter.

The wiring arrangement of Figure 2 is designed to insure proper exposure of a photographic record film. The motor 66 may drive through suitable reduction gearing the film on which some record is to be made. Assuming that the various parts are in the conditions indicated in Figure 2, each revolution of the shaft 48 will effect a closure for a limited period of the contacts 52 and 54. When any such closure takes place, the motor 66 will be energized and will start to run. Very shortly after the motor starts to run, the brushes 72 and 78 will make contact with their respective rings 68 and 74 which are connected to the line 56. The brush 72 provides an auxiliary energization of the motor 66 independent of the closure of the contacts 52 and 54 and of the lower position of the armature 64. Contact of the brush 78 with its ring 74, which should occur just a very slight interval after contact of 72 with 68, produces energization of the coil 60, which attracts the armatures 62 and 64, breaking a contact at 64 and making a contact at 62. The contact which is made at 62 in conjunction with the contact at 52—54 provides a second energizing connection for the coil 60.

After these events, the motor 66 continues to run, causing advance of the film and, as later described, possibly controlling some other events in the making of a proper exposure. Such events may be controlled through the relay 80 which, as noted above, is energized simultaneously with the motor 66.

The motor 66 should be so arranged that it will cause a complete revolution of the rings 68 and 74 before the shaft 48 can make a sufficient portion of a revolution to produce another closure of the contacts 52 and 54. In normal operation, the contact between 52 and 54 will be broken by reason of the continued lowering of the apparatus before the breaks 70 and 76 return to the position of the brushes 72 and 78. Upon disengagement of 52 and 54, no changes in the operation of the motor 66 or relay 60 occur, the former remaining energized through the brush 72 and the latter through the brush 78. On the other hand, when the gaps 70 and 76 come around breaking the contacts between the slip rings and their brushes, the motor 66 will stop and the relay 60 will be deenergized, dropping both the armatures 62 and 64. Accordingly, the apparatus will be ready for another cycle upon the next engagement of the contacts 52 and 54 under the action of cam 50.

On the other hand, let it be assumed that upon causing contact between 52 and 54, the lowering was stopped before the contact was broken. In such case, when the rings 68 and 74 have made one revolution, the motor 66 will stop, but the relay 60 will remain energized because of the closed condition of 62, which will remain so despite the disengagement of brush 78 from ring 74 because of the closure of the shunting circuit at 52 and 54. At the same time, however, the armature 64 will be raised so that the motor will stop despite the closure at 52–54. Thus, it is insured that the motor will not be restarted until the opening of the circuit at 52–54 followed by its subsequent closure.

In other words, with the apparatus of Figure 2, the feed of the film is intermittent and exposure may be controlled through the relay 80 so that only for a limited period in each cycle of operation is there any exposure made.

Figure 3:
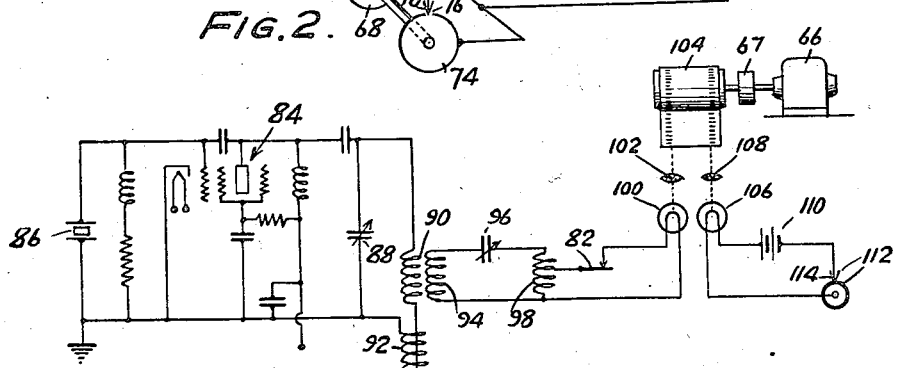
Figure 3 is a wiring diagram showing the application of the invention to an electrical logging apparatus of the high frequency type.

To make clearer the specific application of the invention, reference may be made to Figure 3, which discloses a logging apparatus of a high frequency type in which the record is made in the form of a variable density trace which indicates the nature of the formations traversed by the apparatus. This type of apparatus is disclosed in detail in Bazzoni and Razek application Serial No. 222,609, filed August 2, 1938, to which application reference may be made for details. So far as the present case is concerned, it will suffice to point out that the apparatus comprises a vacuum tube 84 in an oscillator circuit controlled by a crystal 86. The tank circuit comprises a condenser 88 and a coupling coil 90, and in addition, an exploring coil 92 which is located outside the casing of the apparatus and serves to establish an electromagnetic field in the formations which are traversed. Coupled to the coil 90 is a wave meter circuit comprising coils 94 and 98 and a condenser 96. To the coil 98 is coupled a lamp 100 in a circuit which includes the contacts 82 of the relay 80 previously described and illustrated in Figure 2. The lamp 100 through the medium of an optical system indicated at 102 is designed to project a spot of light upon a film 104 which is adapted to be advanced through suitable reduction gearing 67 by means of the motor 66, which has been described.

Additionally there may be provided a lamp 106 designed to project on the film a spot by means of a lens 108, which lamp is energized by a battery 110 in circuit with a brush 114, which bears upon an insulating ring provided over a short angular portion of its circumference with a conductor 112 connected to the side of the lamp opposite the battery 110. This contact disc may be driven through suitable reduction gearing from the shaft 48 so that contact is made at the occurrence of predetermined depth intervals as indicated by the motor of Figure 1.

With the above type of apparatus it is desirable to secure readings at as closely spaced intervals as possible. For example, let it be assumed that an exposure is to be made every foot, in which case overlapping of the spots of light produced by the lamp 100 for successive records should occur. In such case, the gearing of the various parts should be such that contact between 52 and 54 will occur at every foot of lowering of the apparatus. The motor 66 in such case should be so arranged as to cause its rings 68 and 74 to make a complete revolution in a time appreciably less than the minimum time of lowering of the apparatus through a distance of one foot. The advance of the film may be scaled through the reduction gearing 67 so that, for example, the advance might be, say, a twenty-fifth of an inch per foot. Under such conditions, during continuous lowering of the apparatus the relay contacts 82 would be closed for a predetermined period depending on the speed of the motor 66 for each foot of lowering, and it will be obvious that the exposure at each foot interval will be totally independent of the speed of lowering of the apparatus or even of the complete cessation of lowering, whether or not during such cessation contact between 52 and 54 is or is not made. For ease in reference on the final film, the lamp 106 may be caused to flash to mark intervals of, say, one hundred feet. Whether or not the markings produced by the lamp 100 after development overlap or do not overlap, their variable density may be made the measure of the effect of the strata traversed by the instrument upon the field produced by the coil 92. It will be obvious that the mere fact that the trace is intermittently made will not affect the usefulness of the record.

Whereas in the case of a logging apparatus such as just described it is desirable to produce exposures at relatively small depth intervals, a somewhat different problem arises in connection with the type of well surveying instrument illustrated in Figure 4, which is fully described in Williston et al. Patent 1,960,038, dated May 22, 1934. As described in that patent, the well surveying instrument comprises a housing 116 adapted to be received in a protective casing. Within the housing 116 there is a camera indicated at 20, adapted to be driven by a motor 124 which may be the same as that at 66 in Figure 2 in the event that the present invention is applied to such well surveying apparatus. Lamps 126 and 128 serve to illuminate the instruments which are photographed, which include a gyroscope indicated at 130 and a level indicated at 132. The apparatus of the Williston et al. patent includes a watch which is photographed with the other instruments to give indications of depth. In the use of the present invention this watch may be eliminated. Included within the well surveying apparatus are the devices illustrated in Figures 1 and 2. If the camera motor 120 is driven in the fashion of the motor 66 of Figure 2, it will effect advance of the film and then, while the film is at rest, illumination of the lamps to cause an exposure to be made. In the application of the invention to this apparatus it may be desirable to provide that exposure should be made only at intervals of, say, fifty or one hundred feet. Suitable gearing may, therefore, be provided either between the wire measuring device and its commutator, or between the motor and the cam member 86 which provides for intermittent operation of the camera driving motor. In the case of this apparatus the relay 80 may be omitted unless some auxiliary control is desired for some part. The utilization of the arrangement indicated will insure that an exposure is made at every predetermined depth without, however, possibility of over exposure or the possibility of there being made a number of exposures at the same depth.

It may be observed that the recording may take place during both lowering and raising of the apparatus inasmuch as the commutator, unless disconnected at the surface, will produce the alternations of current flow to the controlling motor during movements in both directions. Under such circumstances, there should be kept a proper log at the surface indicating whether or not change of direction has taken place and at what depths such change has occurred.

Instead of utilizing the type of motor indicated in Figure 1, there may be used a mechanical arrangement such as indicated in Figure 5 for insuring that rotation always occurs in the same direction after a period of rest. For example, the motor may be provided with a series of poles indicated at 134, constantly energized and alternately north and south. Each of these poles is provided with an asymmetrically located inwardly projecting portion 136 which, when the armature 138 is energized by current through the armature winding 140, will attract and serve to definitely locate asymmetrically with respect to the poles the outward projecting poles 142 of the armature. With the arrangement as illustrated in Figure 5, reversal of current flow through the armature winding will always advance the armature in a clockwise direction, since it more closely approaches the poles in the clockwise direction than the poles in the counter-clockwise direction.

It will be clear that various changes may be made in the embodiment of the invention without departing from its scope as defined by the following claims.

What we claim and desire to protect by Letters Patent is:

1. Bore hole exploring means comprising apparatus adapted to be lowered within a bore hole, said apparatus including a motor and recording means operated by the motor, supporting means for said apparatus, and means controlled by lengthwise movements of the supporting means for effecting movements of said motor in proportion to the movements of the supporting means within the hole.

2. Bore hole exploring means comprising apparatus adapted to be lowered within a bore hole, said apparatus including a motor and recording means operated by the motor, supporting means for said apparatus comprising an electrically conducting cable, and electrical control means operated in accordance with the lengthwise movements of said cable for effecting, by electrical transmission through the cable, movements of said motor in proportion to said cable movements.

3. Bore hole exploring means comprising apparatus adapted to be lowered within a bore hole, said apparatus including a motor and recording means operated by the motor, supporting means for said apparatus comprising an electrically conducting cable, a device movable proportionally to the lengthwise movements of said cable, and means controlled by the device and operating by electrical transmission through the cable to effect movements of said motor in proportion to said cable movements.

4. Bore hole exploring means comprising apparatus adapted to be lowered within a bore hole, said apparatus including a shaft and recording means operated by the shaft, supporting means for said apparatus comprising an electrically conducting cable, a device movable proportionally to the lengthwise movements of said cable, and means controlled by the device and operating by electrical transmission through the cable to effect movements of said shaft in proportion to said cable movements.

5. Bore hole exploring means comprising apparatus adapted to be lowered within a bore hole, said apparatus including an electric motor and recording means operated by the motor, supporting means for said apparatus, and means for effecting movements of said motor in proportion to movements of said apparatus lengthwise of the hole.

JOHN W. MILLINGTON.
WILLIAM T. EVANS.